(No Model.)
J. C. DUPEE.
BAND CUTTING ATTACHMENT FOR THRASHERS.
No. 253,591. Patented Feb. 14, 1882.
Fig. 1.
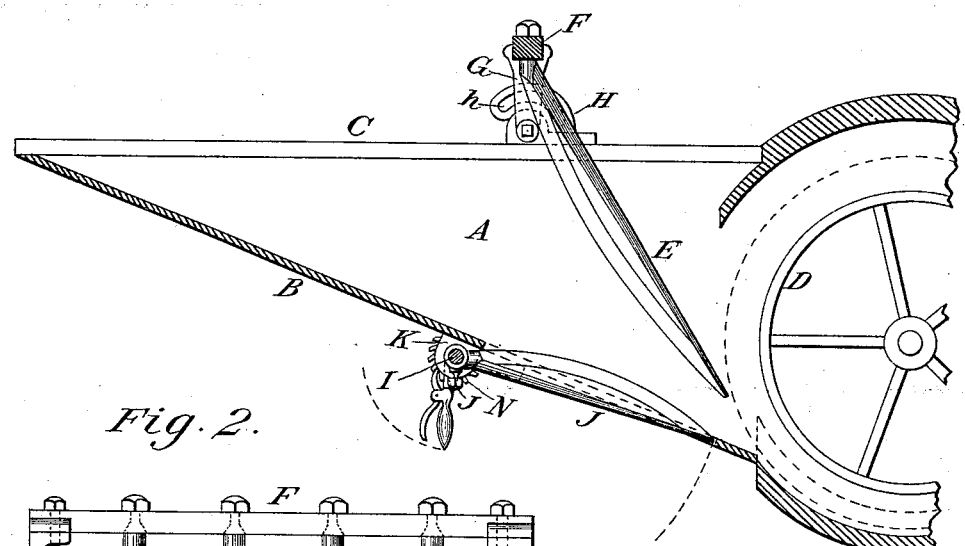
Fig. 2.
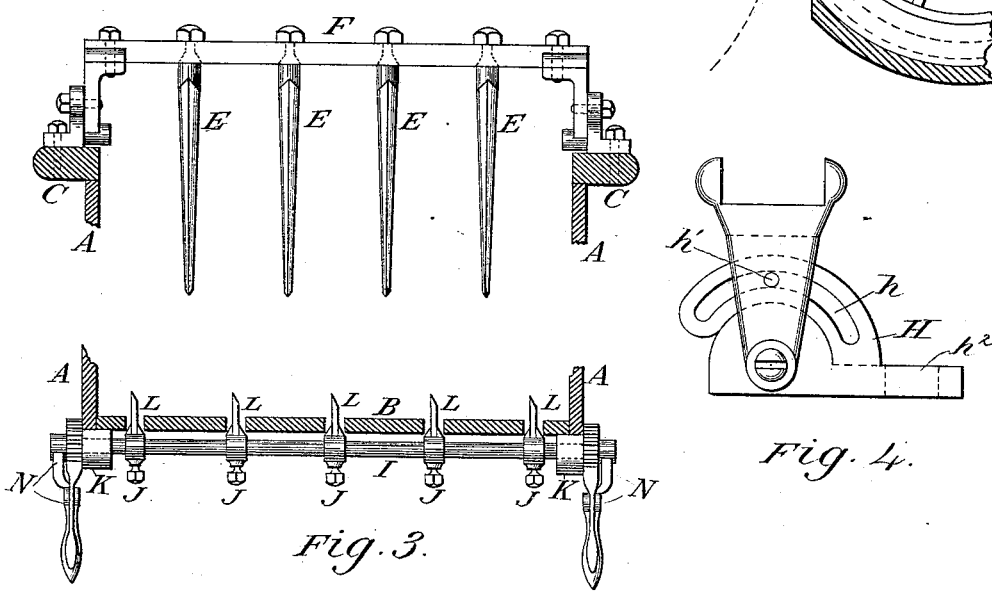
Fig. 4.
Fig. 3.
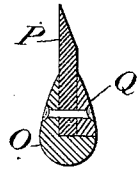
Fig. 5.
Witnesses:
Charles P. Housum
John S. Bixby
Inventor.
John C. Dupee

UNITED STATES PATENT OFFICE.

JOHN C. DUPEE, OF DECATUR, ILLINOIS.

BAND-CUTTING ATTACHMENT FOR THRASHERS.

SPECIFICATION forming part of Letters Patent No. 253,591, dated February 14, 1882.

Application filed August 9, 1880. (No model.)

*To all whom it may concern:*

Be it known that I, JOHN C. DUPEE, a citizen of the United States, residing at Decatur, in the county of Macon and State of Illinois, have invented a new and useful Improvement in Band-Cutting Attachments to Thrashing-Machines, of which the following is a specification.

My invention relates to an improvement in band-cutting attachments for thrashing-machines, in which blades are placed in the hopper and arranged to cut the band of the sheaf as the sheaf is seized by the teeth of the thrashing-cylinder, the blades cutting bands of either wire, straw, or twine; and it consists, first, in a blade or series of blades on an adjustable bar that is fastened to the sides or top of the hopper, said blades projecting downward toward the bottom of the hopper and inward to the thrashing-cylinder; secondly, the device for adjusting said bar and blades to cut the bands on different size sheaves, and, thirdly, in the constructions of the blades. I attain my objects by the mechanism illustrated in the accompanying drawings, in which—

Figure 1 is a vertical transverse section of the hopper and cylinder of a thrashing-machine, showing my attachments for cutting the bands. Fig. 2 is a longitudinal view of the upper series of blades, bar, supports, and means of adjustment, part of the sides of the hopper shown in section. Fig. 3 is a longitudinal view of the lower series of blades, shaft, supports, and means of adjustment, the bottom of the hopper and part of the sides shown in section. Fig. 4 is an enlarged side view of support for bar of upper series of blades, and Fig. 5 is a transverse section showing construction of blade.

Similar letters refer to similar parts throughout the several views.

A is the side of the hopper; B, the bottom, and C the frame, of the same.

D is the thrashing-cylinder, the dotted lines in Fig. 1 showing the sweep of the teeth.

E E E E are a series of blades rigidly fastened to the bar F, which is attached to the shoe G. This shoe is pivoted at $g$ on the support H. The support is provided with a segment-slot, $h$, and the shoe secured thereto by the bolt $h'$, which passes through the slot and screws into the shoe. The support is slotted at $h^2$, as shown by the dotted lines in Fig. 4, as when the blades are raised it may be necessary to move the support to the front of the hopper, so as to bring the blades closer to the bottom of the same. By these two means of adjustment the blades can be set so as to take in and cut the bands on different sizes of sheaves.

I is a shaft, preferably flattened upon one side, upon which the blades J J J are secured with set-screws. The shaft rotates in journals K K, that are secured to the bottom of the hopper, and the blades work in slots L L L in the bottom of the hopper. The ratchet and pawl N enables the shaft to be rotated and held so the blades are raised or lowered. The upper series of blades may be used without the lower, the bottom of the hopper pressing the sheaf against the blades. The blades on the lower series can be adjusted on the shaft so as to go between or be in line with blades of the upper series.

Fig. 5 shows the construction of the blades, O being the body, P the sheet-steel blade, and Q a flat plate, all riveted together. This method of construction enables the replacing of a broken blade at a nominal cost. The top end of the body of the blades for the upper series is made square and goes into and through a square hole in the bar F, where it is secured by a nut. This prevents the blades from turning sidewise. The end of the body of the blades for the lower series is made to fit the shaft and secured thereto, as heretofore described.

The operation of the attachments is obvious from the description, as when the sheaf is fed into the hopper the band is drawn across the knives rapidly as it is seized by the teeth in the thrashing-cylinder, severing it before the sheaf is completely drawn into the machine.

The adjustment devices described are for the purpose of adapting the blades to cut the bands on either large or small sheaves. Equivalent devices for adjusting the blades may be used. These blades may be attached to different shape hoppers by different supports, and also the blades may be rigidly attached to the hoppers.

Having thus fully described my invention, what I claim as new, and desire to secure by Letters Patent, is—

1. In a band-cutter for thrashing-machines, the series of adjustable blades E E, in combination with the hopper and cylinder, substantially as shown and described.

2. In a band-cutter for thrashing-machines, the series of adjustable blades E E and J J J, in combination with the hopper and cylinder, substantially as shown and described.

3. The blades E E, in combination with the bar F, shoe G, and support H, substantially as and for the purpose set forth.

4. The blade for a band-cutter for thrashing-machines, consisting of the body O, blade P, and plate Q, substantially as shown and described.

JOHN C. DUPEE.

Witnesses:
CHARLES P. HOUSUM,
CHARLES M. FLETCHER.